United States Patent [19]

Muth

[11] Patent Number: 4,502,711
[45] Date of Patent: Mar. 5, 1985

[54] SHEET FOLDING METHOD AND PRODUCT

[76] Inventor: Stephan R. W. Muth, 201 Varick St., New York, N.Y. 10014

[21] Appl. No.: 511,189

[22] Filed: Jul. 6, 1983

[51] Int. Cl.³ .................. B42D 19/00; G09B 29/00; B31F 1/00

[52] U.S. Cl. ........................... 281/5; 493/405; 283/34

[58] Field of Search ............... 493/458, 405, 918, 940, 493/947, 455, 456, 451, 379; 46/34, 1 L; 281/2, 5; 283/34, 35; 434/150; 446/80, 147 (U.S. only), 488

[56] References Cited

U.S. PATENT DOCUMENTS 2,525,937 10/1950 Palm ........................................ 281/1
3,753,558 8/1973 Sheroff et al. ...................... 493/162

Primary Examiner—Francis S. Husar
Assistant Examiner—William E. Terrell
Attorney, Agent, or Firm—Leighton K. Chong

[57] ABSTRACT

In conjunction with folding a sheet with center cross folds offset from the diagonals of the sheet, upper and lower lateral folds, a central vertical reverse fold, a pair of vertical side folds defining an inner pleat and a pair of outer pleats, and at the ends of each outer pleat an outer lateral reverse fold and a vertical fold, an improved sheet folding method uses a pair of tuck folds to fold the outer ends under the outer pleats. The tuck folds allow the sheet to return automatically to its folded state which is smaller than a conventional folded sheet.

6 Claims, 4 Drawing Figures

SHEET FOLDING METHOD AND PRODUCT

BACKGROUND OF THE INVENTION

The present invention relates to an improved method and product of folding a sheet, such as paper or cardboard, such that by its inherent fold memory, it is capable of automatically collapsing itself to, or unfolding itself from, a compact folded condition. These folded products are conveniently used, for example, as maps or reference guides that when folded can fit in one's pocket or purse.

Known folding configurations for such products typically form outer rectangular panels with V-shaped ends tapering toward the center of the sheet, which may be affixed to a backer or stiffened cover, and side pleats which dovetail between the outer panels in the folded condition. A good example is shown in U.S. Pat. No. 3,753,558 to Sheroff et al. having an inner pleat and a pair of opposing end pleats that fold between the outer panels.

However, such known configurations have the problem that the end pleats must be comparatively short in length and width in order to avoid binding with its opposite pleat when returning to its folded condition. Because of this limitation, the underlying sheet is restricted in dimensions to rectangles of length not substantially greater than width, and/or to widths which are not substantially greater than twice the width of the product in its folded condition. These restrictions limit the attractiveness of the product and the size of the sheet that can be used for a product that will fit in a pocket or purse in its folded condition. Moreover, the end pleats have a tendency to bind even with sheets of the restricted dimensions.

SUMMARY OF THE INVENTION

It is therefore a principal object of the invention to provide an improved sheet folding method and product which is capable of using sheets of rectangular dimensions where the length may be substantially greater than the width, and/or where the width may be substantially greater than twice, and up to three times, the width of the product in its folded condition. It is also an object of the invention to eliminate the problem of the end pleats binding when the sheet is returning to its folded condition. It is a further object of the invention to provide a folded sheet product which maximizes the dimensions of the sheet that can be used and yet is, in its folded condition, attractive and suitable for fitting in one's pocket or purse.

According to the invention, an improved sheet folding method comprises forming central cross folds, offset from the diagonals of the sheet, and upper and lower lateral folds, which define rectangular outer panels with V-shaped ends tapering to the center of the sheet, forming central vertical reverse folds and a pair of vertical side folds spaced from the central vertical fold, which define an inner pleat and, in conjunction with the cross folds, an pair of opposing outer pleats, and forming, at the ends of one side of each of the outer pleats, an outer lateral reverse fold and a vertical fold, which define, in conjunction with the cross folds, a pair of tuck folds which fold under the opposing ends of the outer pleats when the sheet is returning to its folded condition.

The invention further comprises an automatically foldable and unfoldable product formed by the above method wherein the length of the sheet may be substantially greater than the width, and the width of the sheet may be up to about three times the width of the product.

DESCRIPTION OF THE DRAWINGS

The invention is illustrated by the example shown in the accompanying drawings, of which.

DETAILED DESCRIPTION OF AN EXEMPLARY EMBODIMENT

Figure 1:
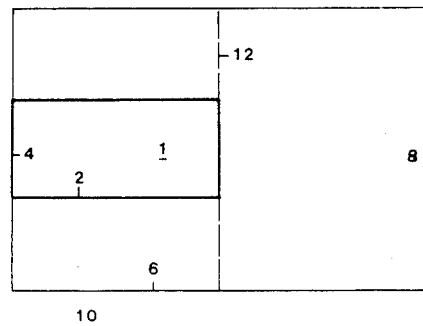
FIG. 1 shows the relative dimensions of a sheet and a resultant product according to the invention.

Referring to FIG. 1, a product 1 of length 2 and width 4 is formed by folding a sheet 10 of length 6 and width 8. A central vertical line 12 illustrates that the length 6 of the sheet 10 is two times the length 2 of the product 1. The width 8 of the sheet can be between two to three times the width 4 of the product. As described herein for the preferred form of the invention, the sheet width is between 2.5 and 3.0 times the folded product width. The invention permits up to about 50% more surface area where the sheet width is substantially up to three times the folded product width, as compared to non-binding conventional configurations where the sheet width is only slightly more than twice the product width. The invention thus maximizes the size of the sheet yet minimizes the width of the product, so that it can conveniently fit into a pocket or purse. The sheet length 6 may be any desired length, and can be substantially greater than the sheet width.

Figure 3:
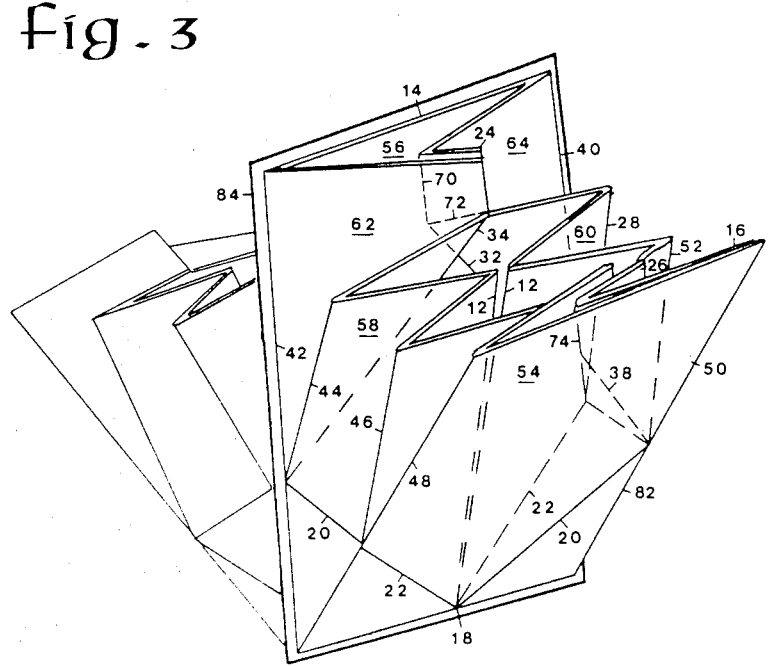
FIG. 3 is a perspective view of a product according to the invention formed by the sheet of FIG. 2 collapsing along its fold lines to a folded condition.
Figure 2:
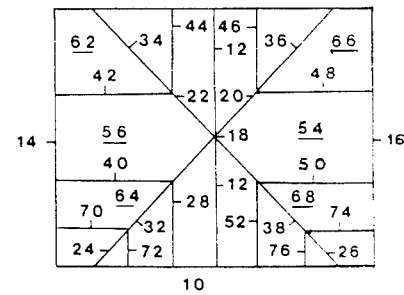
FIG. 2 is a schematic representation of a flat sheet with fold lines in accordance with the invention indicated thereon.

The sheet 10 has formed therein cross folds 20 and 22 which intersect at the center 18 of the sheet. The cross folds may coincide with the diagonals of the sheet. However, it is preferred that the cross folds be offset from the diagonals, as shown in the drawings, in order to leave a greater area that is relatively free from the fold lines. Central vertical folds 12 are formed in reverse fashion (folded backwards) and a pair of opposing side vertical folds 28,44 and 52,46 are provided in order to allow the folds 12 to move together as an opposing inner pleat 58,60 in FIG. 3 when the sheet is folded.

Upper and lower lateral folds 42,48 and 40,50 define the outer panels 54 and 56 of the folded sheet. The panels taper to a V-fold at the center of the sheet due to the cross folds 20 and 22. The opposing outer ends 32,34 and 36,38 of the cross folds are formed in reverse fashion so that, in conjunction with the side vertical folds 28,44 and 46,52 and the lateral folds 42,48 and 40,50, they form a pair of opposing outer pleats 62,64 and 66,68. For the resulting product, the inner pleats and pair of outer pleats automatically fold inward between the outer panels 54 and 56 when the outer panels are folded together, due to the persistence of the folds in the sheet material. A heavier paper-weight or card-weight sheet is preferred for its greater fold memory. The outer panels 54 and 56 can be affixed to a backer or cover 82,84 for protection and to provide stiffer edges to facilitate opening and closing the product.

In accordance with the improvement provided by the present invention, outer lateral reverse folds 70 and 74 and outer vertical folds 72 and 76 are provided at one edge of each of the pair of outer pleats 62,64 and 66,68. In conjunction with the outer ends 32 and 38 of the cross folds, these outer lateral and vertical folds form tuck folds 24 and 26 in outer pleats 64 and 68, which fold under the opposing outer pleats 62 and 66 when the sheet is folded, as shown in FIG. 4.

These tuck folds eliminate the binding problem that occurs when the outer pleats overlap each other, i.e. when the sheet width is greater than twice the folded product width. Thus the outer pleats can have a greater width (indicated by numerals 28,44,46,52) than would otherwise be possible without a binding problem. With the tuck folds, the width of the outer pleats can be approximately equal to the width of the outer panels 54 and 56, thereby minimizing the product width (14,16) to preferrably one-third the sheet width. Further, the length of the sheet can be substantially greater than the width of the sheet due to elimination of the binding problem.

Figure 4:
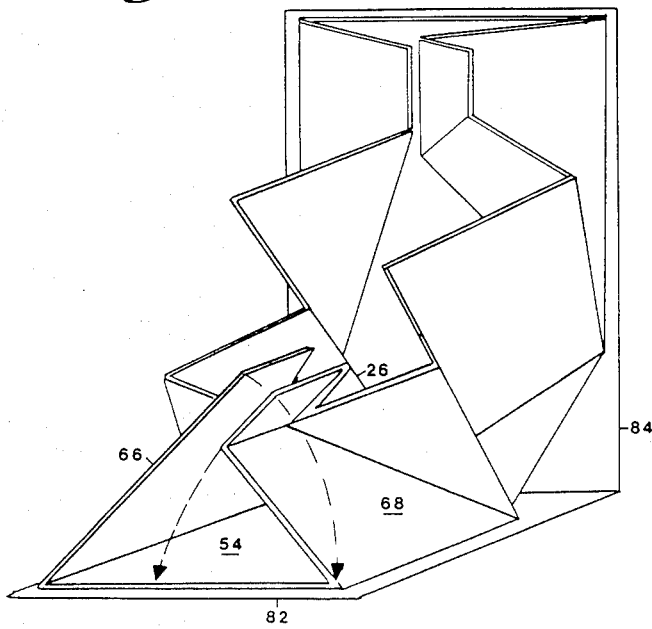
FIG. 4 is a schematic side view of one end of the product in FIG. 3 illustrating the folding of an outer pleat in accordance with the invention.

Referring to FIG. 4, a tuck fold 26 on outer pleat 68 is shown folding under the opposing outer pleat 66, thereby eliminating the binding that would otherwise occur as the overlapping outer pleats moved together. Thus, the width of the outer pleats 66 and 68 can be approximately equal to the width 16 of the outer panel 54, thereby minimizing the width of the folded product while maximizing the size of the sheet.

In the preferred use of the invention for foldable maps, the folding method described above results in an improved product of reduced width in comparison to the width of the unfolded sheet than was heretofore achievable without the binding problem. The folded map can be made small enough to fit in one's pocket or purse and yet provide a large surface area when unfolded. Map or reference information can also be printed on both sides of the inner and outer pleats, thereby increasing the usable area. The cover for the outer panels permits the map to be opened and closed easily, and may also be a divider in a series of maps that are bound together for added convenience and information.

Although this invention is described with reference to the above specific materials, steps, and elements, it will be understood that a variety of modifications may be made without departing from the principles of the invention. For example, parts may be reversed, sequences of method steps may be modified, and various equivalent elements may be substituted for those specifically shown and described. All such modifications are intended to be included within the spirit and scope of the invention, which is defined in the following claims.

I claim:

1. An improved sheet folding method comprises forming central cross folds through the center of the sheet, and upper and lower lateral folds, which define rectangular outer panels with V-shaped ends tapering to the center of the sheet, forming central vertical reverse folds and a pair of vertical side folds spaced from the central vertical fold, which define an inner pleat and, in conjunction with said cross folds, a pair of outer pleats with opposing sides, and forming, at the ends of one side of each of the outer pleats, a lateral reverse fold and a vertical fold, which define, in conjunction with said cross folds, a pair of tuck folds which fold under the opposing sides of the outer pleats when the sheet is in a folded condition.

2. The method described in claim 1, wherein the lateral upper and lower folds are formed in the width of the sheet so as to divide the sheet approximately into thirds, whereby the width of the resulting outer panels is approximately one-third of the width of the sheet.

3. An automatically foldable and unfoldable product formed by the method of claim 1.

4. The product described in claim 3 wherein the length of the sheet is substantially greater than the width, and the width of the sheet is approximately three times the width of the product.

5. The product described in claim 3 further comprising a protective cover to which the outer panels are affixed.

6. The product described in claim 5 wherein the cover serves as a divider for an adjoining foldable product in series with the first.

* * * * *